Figure 1:
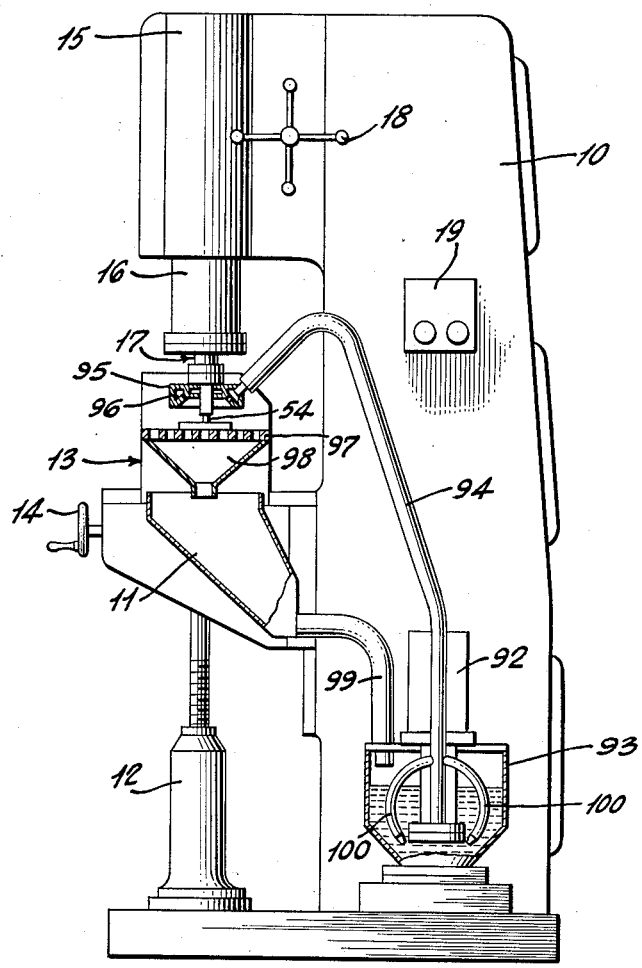

June 25, 1963 V. N. BARKE ETAL 3,094,814
ULTRASONIC ABRASIVE MACHINING APPARATUS
Filed Nov. 21, 1960

INVENTORS:
V. N. BARKE
N. I. BLITSTEIN
I. M. GRIAZNOV
A. L. LIVSHITS
B. K. MECHETNER
S. S. PODLAZOV
D. F. YAKHIMOVICH
BY Glascock, Downing & Seebold
ATTORNEY June 25, 1963

V. N. BARKE ETAL 3,094,814

ULTRASONIC ABRASIVE MACHINING APPARATUS

Filed Nov. 21, 1960

5 Sheets-Sheet 2

INVENTORS:
V. N. BARKE
N. I. BLITSTEIN
I. M. GRIAZNOV
A. L. LIVSHITS
B. K. MECHETNER
S. S. POOLAZOV
D. F. YAKHIMOVICH

BY Glodcock, Downing & Seebold

ATTORNEY

INVENTORS:
V. N. BARKE
N. I. BLITSTEIN
I. M. GRIAZNOV
A. L. LIVSHITS
B. K. MECHETNER
S. S. POOLAZOV
D. F. YAKHIMOVICH

BY

ATTORNEY

INVENTORS:
V. N. BARKE
N. I. BLITSTEIN
I. M. GRIAZNOV
A. L. LIVSHITS
B. K. MECHETNER
S. S. PODLAZOV
D. F. YAKHIMOVICH

BY Glascock, Downing & Seebold
ATTORNEY

United States Patent Office 3,094,814
Patented June 25, 1963

3,094,814
ULTRASONIC ABRASIVE MACHINING
APPARATUS
Vladimir Nikolaevich Barke, Nagatinskoie Chaussee 7, Apt. 4; Naum Isaakovich Blitstein, Sivtsev Vrazhek 12, Apt. 14; Ievgueny Mikhailovich Griaznov, Bolshoi Kozlovsky per 13, Apt. 6; Abram Lazarevich Livshits, 5th Verkhne-Mikhailovsky Proezd 28, Apt. 9; Boris Khaimovich Mechetner, Leningradsky Prospect 28, Apt. 65; Serguei Sergueievich Podlazov, Gorodok Mossoveta, 1st Proezd 3, Apt. 3; and Dmitry Fedorovich Yakhimovich, Vadkovsky per 20, Apt. 55; all of Moscow, U.S.S.R.
Filed Nov. 21, 1960, Ser. No. 70,818
9 Claims. (Cl. 51—59)

This invention relates to machine tools, and more particularly to an ultrasonic abrasive machining apparatus which utilizes a tool vibrating at an ultrasonic frequency, and supplied with a liquid abrasive mixture.

Heretofore, several types of machine tools utilizing a tool vibrating at an ultrasonic frequency have been proposed and utilized, but difficulty has been experienced in obtaining a sufficiently high cutting speed and suitable accuracy, and since all of these machines utilize a transducer for transmitting ultrasonic energy to a tool, it would appear that an improvement in the design of such transducer would result in material improvement of the apparatus. Difficulty has also been experienced in providing a suitable mounting for the transducer which provides for transmission of energy therefrom to a cutting tool, and at the same time permits adequate and accurate adjustment of the tool, without interfering with the cutting operation.

It is accordingly an object of the invention to provide an ultrasonic abrasive machining apparatus incorporating a transducer of improved design, which results in providing increased cutting speed and accuracy when compared to prior machines of this type.

A further object of the invention is the provision of an ultrasonic machining apparatus incorporating a transducer in which the magnet core of the transducer is supported on the bottom wall of a cup-shaped member in which the peripheral wall is relatively thin, and terminates in a relatively heavy flange for mounting the cup-shaped member and magnet core in the tool head of the apparatus.

A still further object of the invention is the provision of an ultrasonic abrasive machining apparatus incorporating a transducer in which the magnet core of the transducer is disposed within a chamber, and further incorporating means for circulating a cooling fluid through the chamber, and for maintaining the level of the fluid below the upper end of the magnet core, thereby preventing the radiation of ultrasonic sound from the upper end of the core.

Another object of the invention is the provision of an ultrasonic abrasive machining apparatus in which a tool head carrying the transducer and cutting tool of the apparatus is mounted for vertical movement, and is provided with counterbalancing means providing a delicate suspension, and including a solenoid, the force of which may be varied by suitable means, to control vertical movements of the cutting tool.

Still another object of the invention is the provision of an ultrasonic abrasive machining apparatus in which a tool head carrying the transducer and cutting tool of the apparatus is mounted for vertical movement in response to operation of an electric motor, and in which operation of the motor may be controlled to counterbalance the weight of the tool head.

A further object of the invention is the provision of an ultrasonic abrasive machining apparatus utilizing a tool vibrating at an ultrasonic frequency, and in which the tool is surrounded by a tubular ring provided with transverse apertures directed toward and downwardly with respect to the tool for supplying an abrasive mixture to the tool, such supply being uniform and properly distributed.

A still further object of the invention is the provision of an ultrasonic abrasive machining apparatus in which a pump is utilized for supplying an abrasive mixture to the cutting tool, such pump incorporating means for maintaining the abrasive in suspension in the liquid mixture.

Another object of the invention is the provision of an ultrasonic abrasive machining apparatus, including a vertically movable tool head carrying a transducer and a cutting tool, and in which yieldable stop means is provided for progressively slowing and stopping downward movement of the tool head at the completion of a machining operation.

Figure 2:
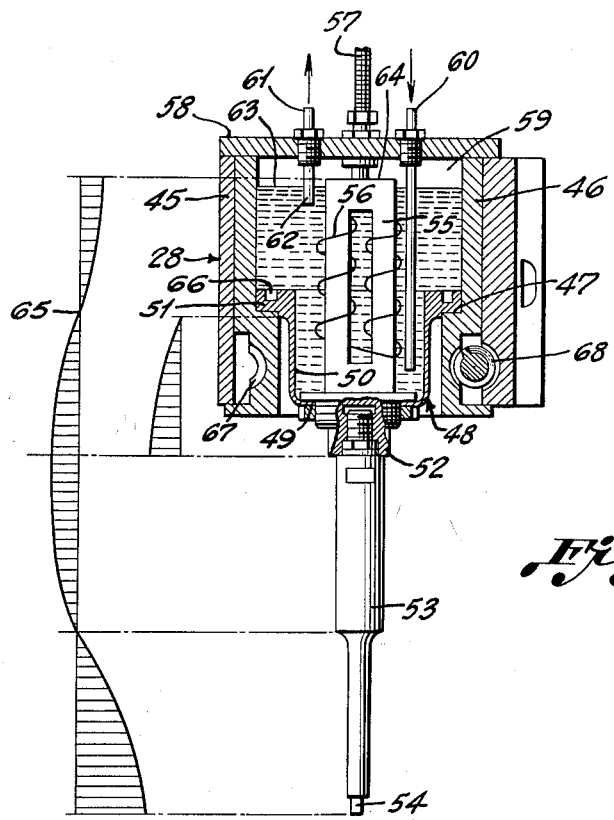
Figure 3:
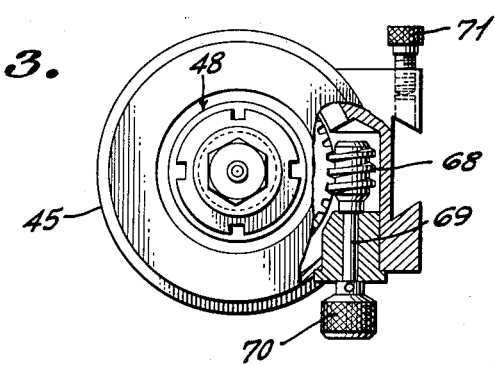
Figure 4:
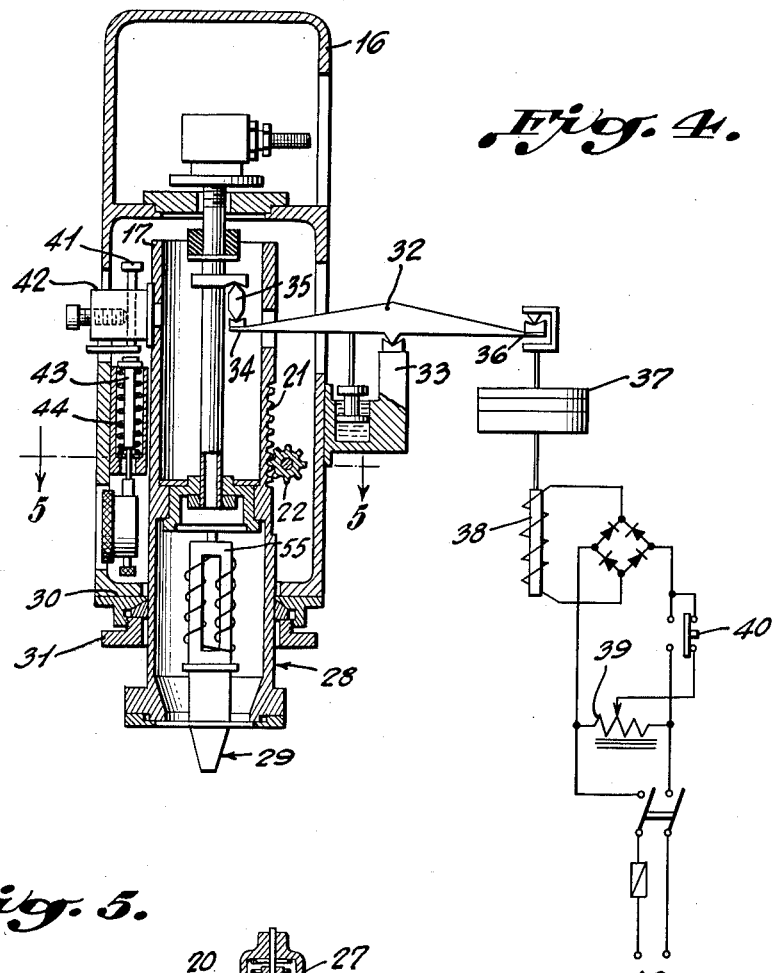
Figure 5:
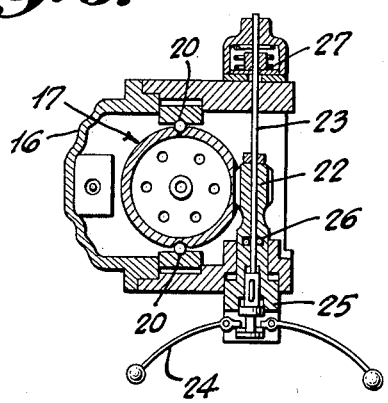
Figure 6:
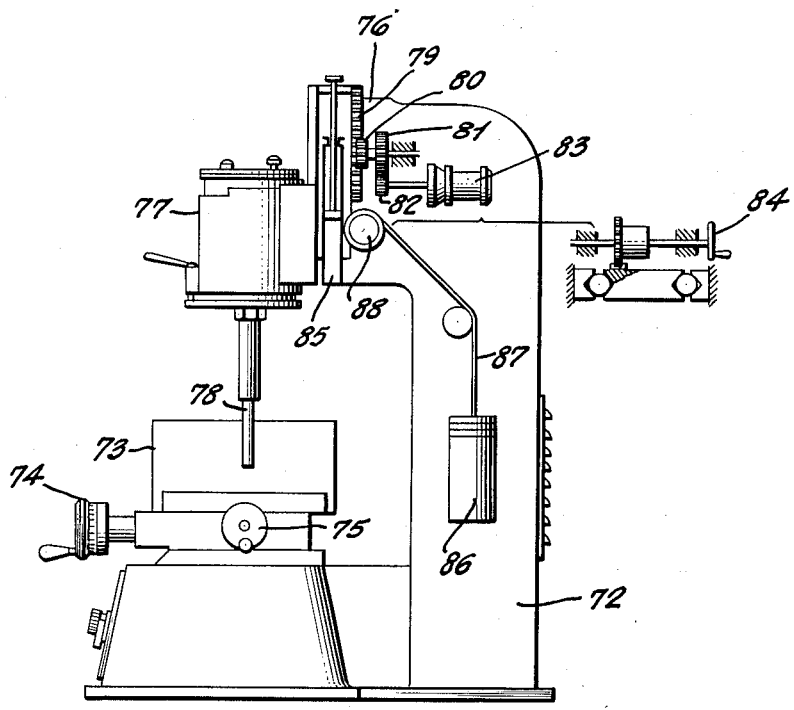
Figure 7:
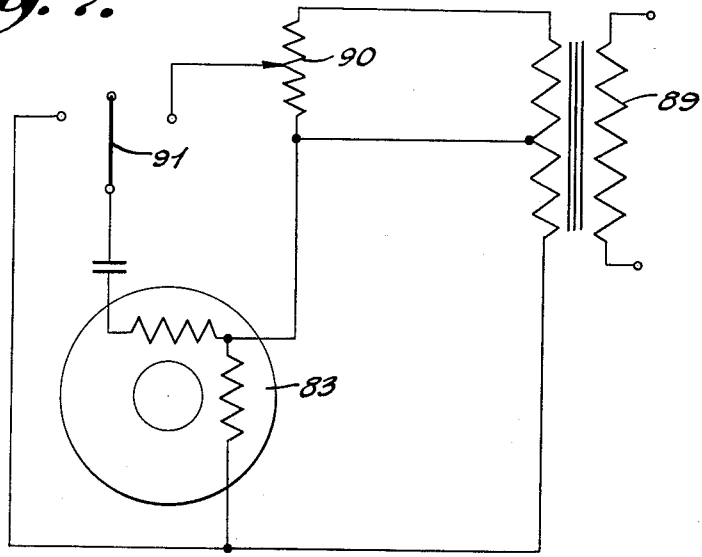
Figure 8:
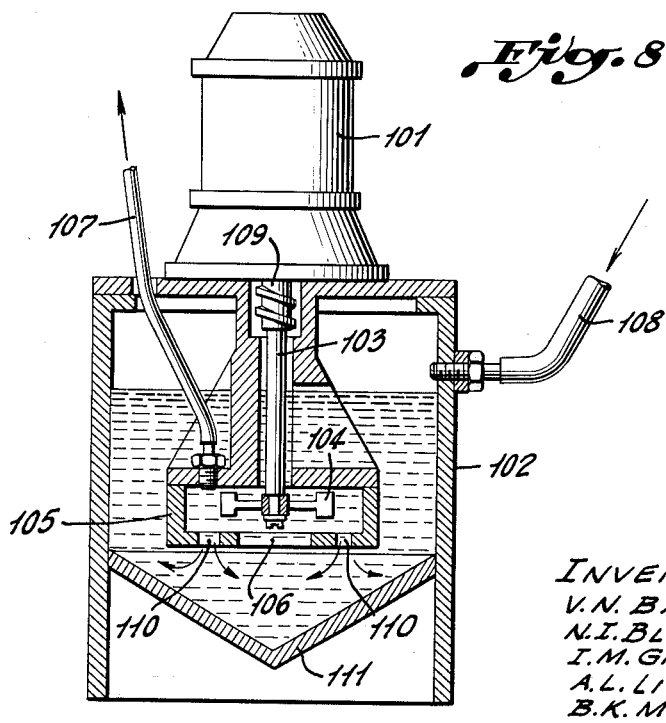

Other objects and advantages of the invention will be apparent from the following description taken in conjunction with the accompanying drawings, wherein:

FIG. 1 is a view in elevation showing generally the apparatus of this invention, together with one specific form of abrasive mixing and supplying apparatus;

FIG. 2, a vertical sectional view showing the transducer utilized in the apparatus of this invention, and particularly showing the mounting means for the magnet core of the transducer;

FIG. 3, a bottom plan view of the transducer shown in FIG. 2;

FIG. 4, a vertical sectional view showing the tool head and mounting for the transducer therein, as well as the feeding means for the tool head and the yieldable stop means, and further showing diagrammatically a counterbalancing means for the tool head;

FIG. 5, a sectional view taken substantially on the line 5—5 of FIG. 4, and showing the manual feed means for vertical movement of the tool head;

FIG. 6, a view in elevation showing an apparatus constructed in accordance with this invention and showing diagrammatically another type of tool head counterbalance means, as well as control and feeding mechanisms;

FIG. 7, a schematic diagram showing the electrical circuit for the tool feed motor; and, FIG. 8, a sectional view showing a pump for supplying a liquid abrasive mixture to the cutting tool, as well as means for maintaining the abrasive in suspension in the liquid.

With continued reference to the drawings, and particularly, FIG. 1, there is shown an ultrasonic abrasive machining apparatus constructed in accordance with this invention, and which may well comprise an upright frame 10 provided with a work-supporting table 11 disposed intermediate the height of the frame 10, and projecting laterally therefrom. If desired, suitable adjusting means 12 may be provided for adjusting the elevation of the work-supporting table 11. Mounted on the table 11 is a work-supporting fixture 13, and a cross feed operated by a hand wheel 14 may be provided for adjusting the work-supporting fixture 13 transversely of the table 11. An arm 15 projects laterally from the frame 10 adjacent the upper end thereof, and the arm 15 overhangs the work-supporting table 11, and slidably mounted in the arm 15 for vertical movement is a tubular member 16 which serves to receive and support a tool head 17, the structure of which will be later described. A hand wheel 18 may be provided for vertically moving the tubular member 16, and a control panel 19 having suitable control switches thereon may be mounted at a convenient location on the frame 10.

With particular reference to FIG. 4, the body 16 of the tool head serves to support the tool head 17 which, as clearly shown in FIG. 4, is also tubular, and as shown in FIG. 5, is mounted for vertical movement by suitable anti-friction bearings 20 mounted in the tubular member 16, and engaging the tool head 17. As best shown in FIGS. 4 and 5, the tool head 17 may be provided with vertically arranged rack teeth 21, which serve to mesh with a pinion gear 22 mounted for free rotation on a shaft 23, which is journalled in the tubular member 16. Mounted on one end of the shaft 23 is a hand wheel 24 carried by bushing 25, which forms part of a clutch 26, which, upon suitable operation of the hand wheel 24, couples the same to the pinion gear 22 to permit manual vertical adjustment of the tool head 17. Mounted on the opposite end of the shaft 23 from the hand wheel 24 is a spring-loaded brake mechanism 27, which may be utilized to control vertical movement of the tool head 17.

Mounted on the lower end of the tool head 17 is a transducer 28, which in turn serves to support a downwardly projecting cutting tool 29, and when it is desired to lock the tool head 17, transducer 28 and cutting tool 29 against vertical movement with respect to the tubular member 16, suitable jaws 30 actuated by a manually engageable nut 31 are provided on the tubular member 16 for engaging the outer surface of the tool head 17, or transducer 28.

Since it is necessary for the proper operation of the apparatus of this invention that the tool head 17, transducer 28, and cutting tool 29 be suspended in rather delicate balance, there is provided a novel counterbalancing means for accomplishing this purpose, and as shown more or less diagrammatically in FIG. 4, such counterbalancing means may well comprise a lever 32 pivotally mounted adjacent the mid-point thereof on a suitable support 33, and with one end 34 engaging a portion of the tool head 17 through a member 35 having knife edges thereon to reduce friction to a minimum. The opposite end 36 of the lever 32 is connected to a counterbalance weight 37, which may be varied in accordance with the load imposed by the tool head and structure carried thereby, and it is contemplated that the weight 37 will be slightly less than that required to counterbalance the vertically movable structure. The balance of the weight necessary to counterbalance the vertically movable structure is provided by a solenoid 38 energized from an autotransformer 39, by means of which the force of the solenoid 38 may be varied, and also provided in the electrical circuit for the solenoid 38 is a push button switch 40, which may be manually actuated to provide for rapid retraction of the vertically movable structure associated with the tool head 17. It is, of course, contemplated that the autotransformer 39 will be adjusted in a proper manner to desired pulling force by the solenoid 38 to delicately balance the tool head 17 and structure carried thereby in order to provide for proper cutting operation.

When utilizing the apparatus of this invention to cut holes entirely through work, it is desirable to slow the downward movement of the cutting tool immediately prior to completion of the cutting operation, and to stop downward movement thereof upon completion of the cutting operation, and for this purpose there may be provided an adjustable stop 41 mounted on a bracket 42 carried by the tool head 17, and the stop 41 may engage a plunger 43 urged upwardly by a spring 44, and compression of the spring 44 will result in slowing downward movement of the tool head 17 and structure carried thereby, and if desired, a suitable switch means may be provided, actuated by the stop 41 to energize the solenoid 38 in a suitable manner to retract the tool head 17 upwardly.

With particular reference to FIG. 2, there is shown the detailed structure of the transducer 28, which may well comprise a vertically disposed shell 45, within which is rotatably mounted a sleeve 46 having an upwardly facing shoulder 47 therein. A cup-shaped member 48 having a bottom wall 49 and a relatively thin, peripheral side wall 50 which terminates in a relatively heavy flange 51 is disposed within the sleeve 46, with the annular flange 51 supported on the shoulder 47 of the sleeve 46. Mounted on the bottom wall 49, and projecting downwardly therefrom is a chuck 52, which serves to removably receive the shank 53 of a cutting tool 54, and also mounted on the bottom wall 49 and projecting upwardly therefrom within the sleeve 46 and cup-shaped member 48 is the magnet core 55 of the transducer. This core may be formed of any suitable alloy, which will provide the proper operation. A suitable winding 56 may be provided on the core 55, and an electrical cable 57 may extend through a top plate 58 provided on the upper end of the sleeve 46 for supplying electrical energy to the winding 56.

It is to be noted that the sleeve 46, together with the cup-shaped member 48, provides a chamber 59 within which the core 55 is disposed, and for the purpose of cooling the core 55 a suitable conduit 60 may extend through the upper plate 58, and downwardly into the cup-shaped member 48, and through which a cooling liquid may be circulated through the chamber 59, and such cooling liquid may escape from the chamber 59, through a discharge conduit 61, and it is to be noted that the lower end 62 of the discharge conduit 61 is positioned in such a manner as to maintain the upper level 63 of the cooling liquid below the upper end face 64 of the magnet core 55. In this manner, radiation of ultrasonic sound from the upper end of the core 55 is substantially prevented. As shown in FIG. 2, the length of the thin, peripheral side wall 50 of the cup-shaped member 48 should be such that where the peripheral wall 50 merges into the flange 51 corresponds to the bias node of the longitudinal vibrations, as indicated by the point 65 on the curve forming a part of FIG. 2. A groove 66 may be provided in the flange 51 to reduce the effect of transverse vibrations.

Since it is desirable to rotate the transducer and cutting tool 54 for adjusting purposes, suitable gear teeth 67 may be provided on the sleeve 46, and a worm wheel 68 carried by a shaft 69, as shown in FIG. 3, and provided with a finger-engaging knob 70 may be utilized to rotate the sleeve 46, and parts carried thereby. If desired, the tubular member 45 may be provided with clamping means 71 for attaching the transducer to the tool head 17.

With particular reference to FIG. 6, there is shown the same general layout of the machine as shown in FIG. 1, but with certain modifications and additional elements, and as shown in FIG. 6, there is provided an upright frame 72 having a work-supporting table 73 provided with a cross feed 74, and a horizontal feed 75, and overhanging the table 73 from the upper portion of the frame 72 is an arm 76 on which is mounted for vertical movement a tool head 77, which serves to support a transducer and cutting tool 78.

Carried by the tool head 77 is a rack 79 meshing with a pinion gear 80, which in turn is driven through a speed reduction gearing 81 by a suitable drive pinion 82 carried by the drive shaft of a motor 83. The tool head 77 may be manually moved by a suitable lever 84, and a dash pot or other suitable damping means 85 may be provided to ensure smooth vertical movement of the tool head 77. The weight of the tool head 77 and parts carried thereby may be counterbalanced by a suitable weight 86 connected to a flexible member 87 received on a winding drum 88 having a gear connected thereto, and engaging the rack 79 or other rack provided on the tool head 77.

With particular reference to FIG. 7, the power supply and control circuit for the motor 83 is shown schematically, and the motor 83 may be provided with electrical energy from a suitable transformer 89, which is connected to a potentiometer 90, and through a three-way switch 91, to the motor 83, by means of which both the direction of feed and the rate of feed may be controlled.

The above described structure shown in FIGS. 6 and 7 provides an alternative arrangement for counterbalancing the weight of the tool head, and takes the place of the solenoid 38 and associated counterbalancing means shown in FIG. 4.

As shown in FIG. 1, a pump 92 is mounted on the frame 10, and this pump serves to supply a liquid abrasive mixture from a tank 93 through a supply conduit to a tubular ring 95, surrounding the shank 53 of the cutting tool 54, and the ring 95 is provided with transverse apertures 96 directed downwardly and inwardly in such a manner as to deliver the abrasive mixture to the cutting tool 54. The work may be supported on a grill 97, from which excess abrasive mixture drains into a sump 98, from which the same is returned through a conduit 99 to the tank 93. In order to maintain abrasive in suspension in the liquid, there may be provided conduits 100 connected to the discharge conduit 94, and discharging into the tank 93 in order to agitate the contents thereof, and thereby maintain the abrasive in suspension.

With particular reference to FIG. 8, there is shown a somewhat modified form of abrasive supplying pump, and in which an electric motor 101 is mounted on a tank 102, and a drive shaft 103 projects downwardly from the motor 101, and carries an impeller 104, disposed within a pump casing, 105, in the tank 102.

The casing 105 is provided with an intake port 106, through which the abrasive mixture in the tank 102 flows into the casing 105, and such mixture is discharged from the casing 105 through a discharge conduit 107 to the cutting tool of the apparatus. The abrasive mixture is returned to the tank 102 through a return conduit 108. In order to prevent abrasive mixture from adversely affecting the bearings of the motor 101, there may be provided a worm or helical screw 109 on the motor shaft adjacent the upper end of the tank 102, and the worm 109 will be of such a nature as to urge abrasive material downwardly into the tank 102. In order to maintain the abrasive in suspension in the liquid within the tank 102, there may be provided auxiliary outlet apertures 110 in the lower end of the pump casing 105, and a portion of the mixture within the casing 105 will be forced downwardly through these apertures 110, and into contact with the conical lower wall 111 of the tank 102, thereby thoroughly agitating the contents thereof, and maintaining the abrasive in suspension in the liquid.

It will be obvious that by the above-described invention there has been provided a highly effective ultrasonic machining apparatus which may be conveniently and economically manufactured from readily available materials, and utilized to provide rapid and highly accurate machining operations. A particular and novel design of transducer is employed, and it is of course understood that a suitable source of ultrasonic energy will be provided for energizing the transducer, but since such source of ultrasonic energy is conventional, no useful purpose is seen in illustrating or describing the same in this application.

It will be obvious to those skilled in the art that various changes may be made in the invention, without departing from the spirit and scope thereof, and therefore, the invention is not limited by that which is shown in the drawings and described in the specification, but only as indicated in the appended claims.

What is claimed is:

1. An ultrasonic abrasive machining apparatus comprising an upright frame, a work supporting table mounted on said frame for vertical and horizontal movement, an arm projecting from said frame and overhanging said table, a tool head mounted for vertical movement on said arm, an ultrasonic transducer secured to said head, said transducer including a sleeve rotatably mounted in said head, means for rotating said sleeve with respect to said head, an upwardly facing shoulder in said sleeve, a cup-shaped supporting member disposed within said sleeve, said cup member having a bottom wall and thin peripheral wall terminating in an annular flange engaging said shoulder, said cup member and said sleeve providing a chamber, a magnet core secured to said bottom wall and vertically disposed in said chamber and a tool secured to said bottom wall and projecting downwardly therefrom, a pump mounted on said frame for supplying a liquid abrasive mixture to said tool, and means to supply ultrasonic energy to said transducer.

2. An apparatus as defined in claim 1, in which means is provided to circulate a cooling liquid through said chamber, and including means for maintaining the liquid level below the upper end of said magnet core, whereby radiation of ultrasonic sound from the upper end of said core is prevented.

3. An apparatus as defined in claim 1, in which counterbalancing means is provided for said tool head, said counterbalancing means including a solenoid and means to vary the force exerted by said solenoid.

4. An apparatus as defined in claim 1, in which said abrasive mixture is supplied to said tool through a tubular ring surrounding said tool above the work, said ring having transverse apertures directed toward and downwardly along said tool.

5. An apparatus as defined in claim 1, in which yieldable stop means is provided for progressively slowing and stopping downward movement of said tool head at the completion of a machining operation.

6. An apparatus as defined in claim 1, in which said pump includes means for maintaining the abrasive in suspension in the liquid.

7. An apparatus as defined in claim 1, in which counterbalancing means is provided for said tool head, said counterbalancing means including an electric motor for moving said tool head vertically and means to control the operation of said motor to counterbalance the weight of said tool head.

8. An ultrasonic abrasive machining apparatus comprising an upright frame, a work supporting table mounted on said frame, an arm projecting from said frame and overhanging said table, a tool head mounted for vertical movement on said arm, an ultrasonic transducer secured to said head, said transducer including a sleeve mounted in said head, an upwardly facing shoulder in said sleeve, a cup-shaped supporting member disposed within said sleeve, said cup member having a bottom wall and a thin peripheral wall terminating in an annular flange engaging said shoulder, said cup member and said sleeve providing a chamber, a magnet core secured to said bottom wall and vertically disposed in said chamber and a tool secured to said bottom wall and projecting downwardly therefrom, a pump mounted on said frame for supplying a liquid abrasive mixture to said tool and means to supply ultrasonic energy to said transducer.

9. An ultrasonic abrasive machining apparatus comprising an upright frame, a work supporting table mounted on said frame, an arm projecting from said frame and overhanging said table, a tool head mounted for vertical movement on said arm, an ultrasonic transducer secured to said head, said transducer including a cup-shaped supporting member, said cup member having a bottom wall and a thin peripheral wall terminating in an annular flange engaging said head, a magnet core secured to said bottom wall and projecting upwardly therefrom, and a tool secured to said bottom wall and projecting downwardly therefrom, means for supplying a liquid abrasive mixture to said tool and means to supply ultrasonic energy to said transducer.

References Cited in the file of this patent

UNITED STATES PATENTS

| | | |
|---|---|---|
| 2,580,716 | Balamuth | Jan. 1, 1952 |
| 2,766,364 | Higgins et al. | Oct. 9, 1956 |
| 2,791,066 | Mahlmeister | May 7, 1957 |
| 2,804,724 | Thatcher | Sept. 3, 1957 |
| 2,819,569 | Angenieux | Jan. 14, 1958 |
| 2,850,854 | Levy | Sept. 9, 1958 |
| 2,939,251 | Greening | June 7, 1960 |
| 2,942,383 | Brown et al. | June 28, 1960 |
| 2,991,594 | Brown et al. | July 11, 1961 |
| 3,015,914 | Roney | Jan. 9, 1962 |